July 25, 1967 J. DAVIDSE 3,333,059

CIRCUIT ARRANGEMENT FOR USE IN COLOUR TELEVISION RECEIVERS

Filed March 29, 1965

INVENTOR.

JAN DAVIDSE

BY

Frank R. Jifari

AGENT

United States Patent Office 3,333,059
Patented July 25, 1967

3,333,059

CIRCUIT ARRANGEMENT FOR USE IN COLOUR TELEVISION RECEIVERS

Jan Davidse, Rotterdam, Netherlands, assignor to North American Philips Company, Inc., New York, N.Y., a corporation of Delaware Filed Mar. 29, 1965, Ser. No. 443,604
Claims priority, application Netherlands, Apr. 2, 1964, 6,403,484
6 Claims. (Cl. 178—5.4)

ABSTRACT OF THE DISCLOSURE

In a color television receiver, the chrominance signal is differentiated twice to produce a correction signal that is added to the brightness signal. This system can eliminate errors in the image brightness at transitions, and also can eliminate the necessity of a subcarrier filter in the brightness channel. The system is adaptable to receivers having three-gun and single-gun display tubes.

This invention relates to circuit arrangements for use in colour television receivers of the type having a brightness channel for applying the luminance signal of a gamma-corrected total composite video signal to a display tube having a non-linear grid voltage-beam current characteristic, and a colour channel including a filter for passing the colour information of the total colour television signal and having a bandwidth which is smaller than that of the brightness channel, for applying the colour information of the composite video signal—to the display tube.

In such colour television receivers faults may occur in the brightness reproduced by the display tube due to the gamma correction performed at the transmitter and to the non-linear beam current-grid voltage characteristic of the colour display tube.

In fact, as appears from the article by D. Richman "Directions of Improvements in NTSC Colour Television Systems" published in PIRE; vol. 44, No. 9, September 1956, pages 1125–1139 and more particularly page 1127, for a gamma-corrected colour television signal the brightness reproduced by a display tube having a non-linear beam current-grid voltage characteristic depends not only upon the luminance signal Y′ from the composite video signal but also upon the colour signals likewise fed to the display tube through the colour channel.

Since the brightness channel has a bandwidth which is much greater than that of the colour channel which has to pass the colour information, this means that especially the higher frequencies are important if the said faults occur in the reproduction of brightness. Now, the higher frequencies occur only during changes, that is to say whenever one colour changes to another or when a white image changes to a colour image or conversely. In fact, upon such a change higher frequencies play a part which can be passed on through the brightness channel but cannot be passed on through the colour channel. If a given contribution into brightness originates from the signal which reaches the display tube through the colour channel, this contribution will disappear during one of the said changes and return only if the change is completed, that is to say if the stationary condition has been restored.

This phenomenon is indicated in literature as "luminance notch" and is interfering since the brightness varies precisely upon the said changes. In order to mitigate these disadvantages, the circuit arrangement according to the invention is characterized in that for correction of the faults occurring in the brightness of the colour television display the colour channel includes two differentiating network which differentiate twice the colour signal derived from the filter in the colour channel, the arrangement including an adder circuit to which the colour signal differentiated twice is applied, together with the luminance signal transmitted through the brightness channel which has been delayed by means of a delay line to the same extent as the colour signal differentiated twice, before being applied to the display tube.

In order that the invention may be readily carried into effect, a few possible embodiments thereof will now be described in detail, by way of example, with reference to the accompanying diagrammatic drawing, in which.

Figure 1:
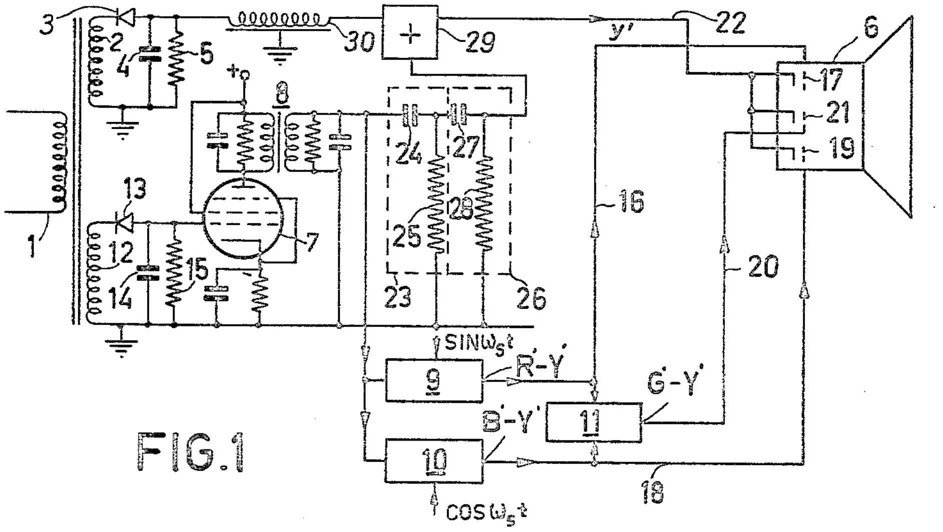
FIGURE 1 shows a first embodiment for use in a colour television receiver employing a three-gun colour television display tube.

In FIGURE 1 a winding 1 is included in the output circuit of the final intermediate frequency amplifier of the colour television receiver which has amplified the complete colour television signal on intermediate frequency level. The winding 1 is magnetically coupled to a winding 2 to which a detector circuit is connected comprising a diode 3, a capacitor 4 and a resistor 5. The detector circuit comprising the elements 3, 4 and 5 is provided to detect the intermediate frequency colour television signal for the first time. This detector is included in the brightness channel of the colour television receiver which applies the luminance signal Y′ to a colour television display tube 6. The index added to the luminance signal Y′ indicates that the incoming colour television signal had been subjected to gamma correction, as is common practice, for example, in the NTSC-system. Due to this gamma correction the constant luminance principle no longer holds good. As a result the contribution into the brightness of the image displayed by the tube 6 depends not only upon the luminance signal Y′ but also upon the colour information that likewise reaches the display tube 6 through the colour channel.

This colour channel includes a tube 7 and an associated bandpass filter 8, a synchronous detector 9 for synchronously demodulating a red colour difference signal $R'-Y'$, a synchronous demodulator 10 for synchronously demodulating a blue colour difference signal $B'-Y'$ and an adding circuit 11 which develops a green colour difference signal $G'-Y'$ from the red and blue colour difference signals.

The colour channel receives its information from a secondary winding 12, which is also magnetically coupled to the winding 1. Winding 12 is connected to a second detector circuit comprising a diode 13, a capacitor 14 and a resistor 15. The colour television signal which has been detected once by the detecting network 13, 14, 15 is applied to the first control grid of the tube 7. This tube amplifies and applies the said signal to the bandpass filter 8 which passes only the colour signals of this colour television signal applying them to the synchronous demodulators 9 and 10. The receiver also includes a local oscillator which is synchronised with the aid of the co-transmitted burst signal and from which a regenerated auxiliary carrier signal of the form sin $\omega_s t$ is derived which signal is applied as a reference to the synchronous demodulator 9. Thus, the red colour difference signal $R'-Y'$ is developed across the output of the demodulator 9. It is to be noted that the indices added to the characters R, B and G likewise indicate that the colour signals have been subjected to gamma correction in order to compensate for the non-linearity of the display tube 6.

The colour signal derived from the bandpass filter 8 is also applied to the second synchronous demodulator 10 to which an auxiliary carrier signal likewise derived from the local oscillator is applied, the latter reference signal being 90° shifted in phase, however, with respect to the reference signal applied to the demodulator 9 and thus having the form cos $\omega_s t$. The blue colour difference signal $B'-Y'$ is thus developed across the output of the demodulator 10. These two colour difference signals are applied to the stage 11 which adds the blue and red colour difference signals in given ratios to produce the green colour difference signal $G'-Y'$ across the output thereof.

In the example of FIGURE 1 the red colour difference signal is applied through a lead 16 to a control grid 17 of the red gun of the display tube 6, the blue colour difference signal through a lead 18 to a control grid 19 of the blue gun and the green colour difference signal through a lead 20 to a control grid 21 of the green gun of the display tube 6. The three cathodes associated with the red, blue and green guns are connected together and connected through a lead 22 to a brightness channel of the colour television receiver.

Since only the formation of the luminance signal is important for the present invention the handling of the colour signal will be disregarded and it will only be investigated how the various signals described hereinbefore are added together and how this addition gives rise to an error in the displayed brightness due to the non-linearity of the display tube 6.

As is well-known, the control of the electron beams required for the display is obtained by adding the red colour difference signal $R'-Y'$ to the luminance signal Y' in the red gun of the display tube 6, whereas the luminance signal Y' is added to the green colour difference signal $G'-Y'$ in the green gun and, lastly, the luminance signal Y' is added to the blue colour difference signal $B'-Y'$ in the blue gun. It can be computed how the brightness of the displayed image depends upon the described control signals. For this reference may be made to the said article in PIRE, Equation 1, page 1126. If Equation 1 is expanded for a given display tube, thereby assuming for the sake of simplicity that the non-linearity of the display tube is a quadratic one, then the Equation 2 on page 1127 of the PIRE article results.

The Equation 2 may be written for the sake of simplicity as:

$$Y^2=Y'^2+\Delta^2$$

In the latter equation $\Delta^2$ is the contribution in brightness which reaches the display tube through the colour channel. From this it follows that the brightness observed by the viewer consists of two portions, namely one portion $Y'^2$ which reaches the display tube through the brightness channel and one portion $\Delta^2$ which reaches the display tube through the colour channel.

If, as has been described in the preamble, one colour changes to another colour or a whilte image changes to a colour image or conversely, then the contribution $\Delta^2$, since this change is invariably represented in the signal by high frequencies, will temporarily disappear as the colour channel with its small bandwidth is not capable of passing on the high frequencies. The luminance is thus varied whenever a change occurs, which is naturally extremely interfering since the very edges of a given image, which do not differ for example, in luminance but do differ in colour, show a variation in luminance during the change.

In order to compensate for this fault in luminance it is thus necessary to realize that the compensating signal must also occur only during the changes, that is to say the compensation must likewise be only temporary.

To provide such compensation, use is also made of the fact that the luminance signal derived from the detecting network 3, 4, 5 includes, in addition to the luminance signal proper, the auxiliary carrier signal. This auxiliary carrier signal, unless special steps are taken, will also be able to produce a fault in the luminance signal due to so-called auxiliary carrier rectification in the display tube 6. In the majority of receivers it is therefore common practice to provide the brightness channel with a filter for suppressing the colour signals in the brightness channel so that these colour signals cannot add to the brightness in the display tube 6. According to the invention it is possible, however, to omit such a suppression filter and ensure by the addition of information obtained from the colour channel that neither the colour information through the brightness channel nor the contribution $\Delta^2$ can give rise to the colour faults during the changes. This can be proved as follows:

In order to compensate for the brightness fault during the changes, it is necessary to add a signal to the luminance signal proper so that this added signal acts only during the changes and can thus substitute the contribution into brightness provided through the colour channel.

Now, the total colour television signal which has been detected once, can be written as follows:

$$E_t=Y'_1+Y'_h+A'_c \cos(\omega_s t+\psi) \quad (1)$$

Figure 3:
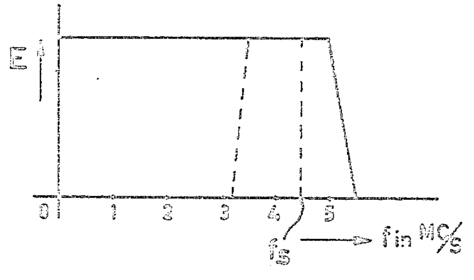
FIGURE 3 shows a possible frequency spectrum of a colour television system operating according to the 625-line system.

In this equation the luminance signal Y' is divided into a portion $Y'_1$, being the portion of the luminance signal which includes the low-frequency components, and a portion $Y'_h$ being the portion which includes the high-frequency components, the so-called "mixed highs." This so-called "mixed highs" portion lies in the frequency band between about 1 mc./s. and 5 mc./s., as shown in FIGURE 3, which illustrates a possible frequency spectrum for a colour television system operating according to the 625-line system with a bandwidth of approximately 5 mc./s.

The signal $E_t$ also includes a term:

$$A'_c \cos(\omega_s t+\psi)$$

which term represents the auxiliary carrier signal and which partly lies in the same frequency range as does the portion $Y'_h$ of the luminance signal and whose auxiliary carrier frequency $\omega_s(\omega_s=2\pi f_s)$ has been fixed on 4.5 mc./s.

These signals in themselves do not interfere with each other during display, as is well-known, due to the fact that the auxiliary carrier frequency $f_s$ is an odd multiple of half the line frequency. That the colour signal, upon reaching the display tube through the brightness channel, can nevertheless produce a fault in brightness may be demonstrated as follows:

Writing $Y'_1+Y'_h=Y'$ the signal according to Equation 1 changes to:

$$E_t=Y'+A'_c \cos(\omega_s t+\psi) \quad (2)$$

The quadratic characteristic assumed hereinbefore for the display tube 6 causes the signal according to Equation 2 to be quadrated in the display tube. The contribution into luminance may thus be represented by the signal $$E_t^2=Y'^2+2Y'A_c \cos(\omega_s t+\Psi)+\frac{A'^2_c}{2}\{1+\cos 2(\omega_s t+\Psi)\} \quad (3)$$

The term $2Y'A'_c \cos(\omega_s t+\psi)$, which still includes the auxiliary carrier frequency $f_s$, will not interfere since its interfering influence is hardly noticeable due to the choice of an odd multiple of half the line frequency.

The term:

$$+\frac{A'^2_c}{2}\cos 2(\omega_s t+\Psi)$$

has a frequency equal to twice the frequency $f_s$ of the auxiliary carrier and thus will have substantially no interfering influence.

There remains the term:

$$\frac{A'^2_c}{2}$$

which is produced by so-called colour detection in the display tube itself and which therefore provides an undesirable contribution into luminance.

In known receivers the occurrence of the term:

$$\frac{A'_c{}^2}{2}$$

may be avoided by including a suppression filter in the brightness channel which suppresses the complete colour signal $A'_c \cos(\omega_s t+\psi)$. According to the invention it is not necessary, however, to include such a suppression filter in the brightness channel since the contribution $\Delta^2$, which influences the brightness through the colour channel, may approximately be represented by $$\Delta^2=kA'_c{}^2$$

where $k$ is a constant and $A'_c$ is the amplitude of the colour signal.

Since this contribution disappears during the changes of colour due to the limited bandwidth of the colour channel, it is necessary to add to the luminance signal a signal such as to appear only during the changes. If this added signal is indicated by S the luminance signal becomes $Y'+S$ and the total contribution into brightness becomes:

$$Y=(Y'+S)^2+\Delta^2=Y'^2+2Y'S+S^2+kA'_c{}^2$$

If it is arranged that, as previously stated, S occurs only during the changes and that $$2SY'+S^2=kA'_c{}^2 \qquad (5a)$$

then the signal $2SY'+S^2$ will substitute the signal $kA'_c{}^2$ during the changes.

This condition is fulfilled if, according to the invention, the signal S is chosen to be:

$$s=\eta\left(E_s+\frac{1}{\omega_s^2}\frac{d^2E_s}{dt^2}\right) \qquad (6)$$

where $$E_s=A'_c\cos(\omega_s t+\psi)$$

is the colour signal and $\eta$ is a constant.

If the brightness channel does not include a suppression filter the signal $E_s$ is already present in the signal derived from the detecting circuit 3, 4, 5 and need therefore not be added.

The signal:

$$\frac{d^2E_s}{dt^2}$$

is obtained by differentiating twice the signal derived from the bandpass filter 8, namely the first time by means of a first differentiating network 23 comprising, for example, a capacitor 24 and a resistor 25, and the second time by means of a second differentiating network 26 comprising, for example, a capacitor 27 and a resistor 28.

The signal differentiated twice is added, in an adder circuit 29, to the luminous signal which likewise reaches the adder circuit 29 through a delay line 30. The retardation period of the delay line 30 is equal to that of the bandpass filter 8 increased by any retardation time of the differentiating networks 23 and 26 so that the signals added together in the adder circuit 29 will have the same phase.

It is to be noted that no further delay line is included in the conductor 22 between the adder circuit 29 and the cathode of the display tube 6. This is possible only if the synchronous demodulators 9 and 10 are of the push-pull type so that they do not require additional filters for suppressing the reference signals and auxiliary carrier signals in their outputs.

If push-pull demodulators are not used, further filters for suppressing the applied signals are required since only the demodulated signals must be derived from the outputs of the demodulators 9 and 10 and the applied signals have to be suppressed. In the event further filters are added to the synchronous demodulators 9 and 10, the conductor 22 must include a second delay line having a retardation period equal to that of these further filters.

That the desired correction may be obtained by adding a signal S according to Equation 6 can be proved as follows:

The term:

$$\frac{d^2E_s}{dt^2}$$

may be written as:

$$\left\{\frac{d^2A'_c}{dt}-\left(\omega_s+\frac{d\psi}{dt}\right)^2A'_c\right\}\cos(\omega_s t+\psi)-\left\{\frac{d^2\psi}{dt^2}A'_c+2\left(\omega_s+\frac{d\psi}{dt}\right)\frac{dA'_c}{dt}\right\}\sin(\omega_s t+\psi) \qquad (7)$$

Inserting Equation 7 into Equation 6 yields:

$$S=\eta\left[\left\{\frac{1}{\omega_s^2}\frac{d^2A'_c}{dt^2}-\frac{2}{\omega_s}\frac{d\psi}{dt}A'_c-\frac{1}{\omega_s^2}\left(\frac{d\psi}{dt}\right)^2A'_c\right\}\cos(\omega_s t+\psi)-\left\{\frac{1}{\omega_s^2}\frac{d^2\psi}{dt^2}A'_c+\frac{2}{\omega_s}\frac{dA'_c}{dt}+\frac{2}{\omega_s^2}\frac{d\psi}{dt}\frac{dA'_c}{dt}\right\}\sin(\omega_s t+\psi)\right] \qquad (8)$$

The term $E_s$ itself has been eliminated because it occurs with a positive sign in Equation 6 and with a negative sign in Equation 7. The correction signal proper S as represented by Equation 8 thus includes only signals having amplitudes which are first or second order differential quotients according to time, that is to say signals which occur only during changes, since the ordinary stationary condition is that in which the signal is transmitted continuously and this may be represented by the term $E_s=A'_c\cos(\omega_s t+\psi)$. Variations or phenomena of changes may be represented by a differential quotient. The differentiated signal is thus present only during the changes and replaces the brightness contribution which disappears during the changes and which reaches the display tube 6 through the synchronous demodulators 9 and 10 and the adder circuit 11.

Thus, what is actually done consists in deriving the colour contribution present in the colour channel for the synchronous demodulation and adding it to the luminance signal in such manner that the continuous term $E_s$ disappears and only change-over terms remain. This is possible because differentiating twice may be regarded, on the one hand, as a 180° phase shift (differentiating a sinusoidal signal once provides a 90° phase shift) and, on the other hand, as a highpass filter which passes the change-over terms but cuts off the continuous terms.

The signal S may be simplified into $$S=\eta\sqrt{A^2+B^2}.\cos(\omega_s t+\psi+\varphi) \qquad (9)$$

where:

$$A=\frac{1}{\omega_s^2}\frac{d^2A'_c}{dt^2}-\frac{2}{\omega_s}\frac{d\psi}{dt}A'_c-\frac{1}{\omega_s^2}\left(\frac{d\psi}{dt}\right)^2A'_c$$

$$B=\frac{1}{\omega_s^2}\frac{d^2\psi}{dt^2}A'_c+\frac{2}{\omega_s}\frac{dA'_c}{dt}+\frac{2}{\omega_s^2}\frac{d\psi}{dt}\frac{dA'_c}{dt}$$

and $$\tan\varphi=\frac{B}{A}$$

Inserting Equation 9 into Equation 5 provides the total brightness on the screen of the display tube:

$$Y=Y'^2+2Y'\eta\sqrt{A^2+B^2}\cos(\omega_s t+\psi+\varphi)$$
$$\eta^2(A^2+B^2).\cos^2(\omega_s t+\psi+\varphi)+kA'_c{}^2 \qquad (10)$$

The term $2Y'\eta\sqrt{A^2+B^2}\cos(\omega_s t+\psi+\varphi)$ is not visible in the displayed image since the frequency $f_s$ is an odd multiple of half the line frequency.

The term $\eta^2(A^2+B^2)\cos^2(\omega_s t+\psi+\varphi)$ changes to:

$$\tfrac{1}{2}\eta^2(A^2+B^2)+\tfrac{1}{2}\eta^2(A^2+B^2)\cos 2(\omega_s t+\psi+\varphi) \qquad (11)$$

The term with $2\omega S$ is again not visible so that, due to the rectifying action in the display tube 6 itself, a term $\frac{1}{2}\eta^2(A^2+B^2)$ remains, which occurs only during the changes when the term $kA'^2_c$ disappears.

By choosing:

$$\tfrac{1}{2}\eta^2(A^2+B^2)=kA'^2_c \qquad (12)$$

the condition made in Equation $5a$ is fulfilled and the compensation is as complete as possible if the luminance notch is at its maximum.

From Equation 12 it is possible to compute the value for $\eta$. It appears that this $\eta$ must exceed unity which means a small complication since the signal $E_s$ as given in Equation 6 is directly the colour term passed on through the brightness channel. A value of $\eta>1$ means that the term $E_s$ passed on through the brightness channel must actually be amplified slightly with respect to the low-frequencies in the luminance signal. This may be realized, for example, by using so-called chromaboost in the brightness channel, that is to say choosing the frequency characteristic of the total brightness channel so that the amplification of the higher frequencies exceeds that of the low frequencies.

However, no great error is made if $\eta$ is chosen to be equal to unity. Although the compensation of the brightness errors is not then as complete as possible the resulting compensation suffices in practice.

Instead of using the differentiating networks 23 and 26 comprising the capacitors 24, 27 and the resistors 25, 28, it is possible to use differentiating networks comprising resistors and inductors.

A method of compensation similar to that described for a receiver having a three-gun display tube is naturally also possible for a receiver having a one-gun tube. This is shown in FIGURE 2, in which corresponding elements are indicated as far as possible by the same reference numerals as in FIGURE 1.

Figure 2:
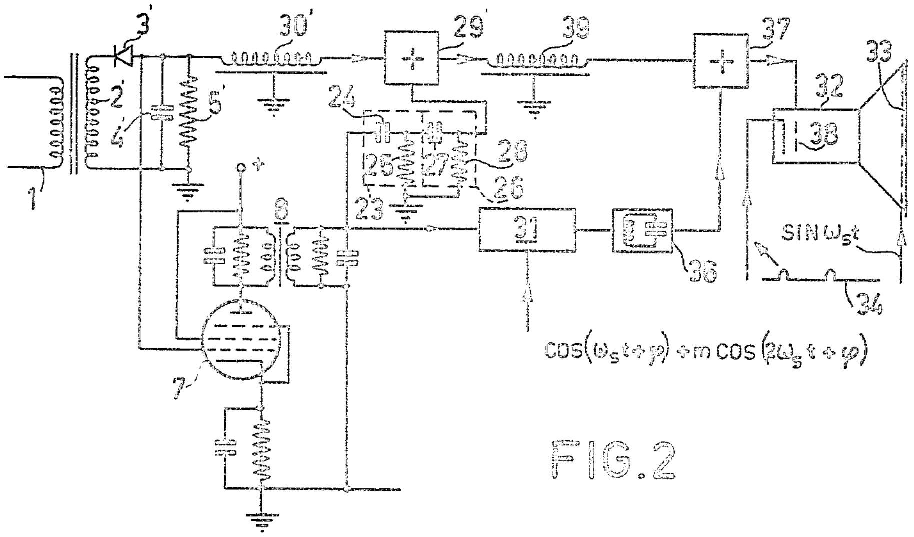
FIGURE 2 shows a second embodiment employing a one-gun colour television display tube.

The circuit arrangement shown in FIGURE 2 differs further from that of FIGURE 1 by including only one detector circuit for detecting the incoming colour television signal for the first time. This detector circuit is indicated by numerals 2', 3', 4', and 5'. The signal derived from the detecting circuit is applied, on the one hand, through a delay line 30' to an adder circuit 29' and, on the other hand, to the tube 7. The anode circuit of tube 7 includes the bandpass filter 8 followed by the two differentiating networks 23 and 26 which add the compensating signal, in a similar manner as described with reference to FIGURE 1, through the adder circuit 29' to the luminance signal applied through a delay line 30'. Thus, it will be evident that the full compensation of the luminance signal is effected in a similar manner as described with reference to FIGURE 1.

The colour signal derived from the bandpass filter 8 is now modified, however, in a device 31 in order to obtain therefrom a modified chroma-signal and a modified luminance signal. The modified chroma-signal is the so-called dot-interlacing signal which may readily be applied to the control electrode of a one-gun display tube 32 which itself provides for the synchronous demodulation. For this purpose, the display tube 32 which in the example, is of the Lawrence type includes a colour control-grid 33 to which an auxiliary carrier signal sin $\omega_s t$ is applied which is derived from the local oscillator in the colour receiver which regenerates the auxiliary carrier signal and is synchronized with the incoming burst signal. A suppressing signal 34 is applied to the cathode of the display tube 32 to provide for the electron beam in this tube to be suppressed when the electron beam, as it is wobbling over a packet of three-colour strips, passes the same strip for the second time during one period of the auxiliary carrier signal. The signal 34 may also be derived from the local oscillator through a phase-shifting network and a limiting circuit. In the device 31 the colour signal is also converted into a so-called monochrome signal $M'-Y'$ which is likewise necessary for correctly reproducing the brightness with respect to the colour signal with a one-gun display tube. The signals derived from the device 31 are applied to a second adder circuit 37 through a lowpass filter 36 which suppresses any residual high frequencies from the signal, the luminance signal Y' and the modified signal being added together in the second adder circuit 37 before being applied to a control electrode 38 of the display tube 32. It may be seen from FIGURE 2 that the brightness channel includes a second delay line 39. The retardation period of the delay line 39 is equal to the retardation period of the filter 36 so that no phase difference exists between the signal applied from the delay line 39 to the adder circuit and the signal derived from the filter 36. If the filter 36 is unnecessary due to a push-pull design of the device 31, the delay line 39 can also be omitted.

It is to be noted that, in the example of FIGURE 2, the dot-interlacing signal derived from the filter 36 may also be used for compensating the brightness fault since the dot-interlacing signal is a signal whereby the three colour signals are relatively modulated on the auxiliary carrier at angles of 120°. Although the information is not then exactly the same as that present in the luminance channel since the signal $E_s$ occurring in the colour television signal detected once has been modified in the device 31, it is thus still possible to obtain reasonable compensation. In this case the adder circuit 29' may be dispensed with and the differentiating networks 23 and 26 must be included between the output of the filter 36 and the output of the delay line 39. It will be evident that in this case the delay the delay lines 30' and 39 can be united to form a single delay line. However, it is necessary to ensure that the monochrome signal $M'-Y'$ and the dot-interlacing signal appearing at the output of the filter 36 are added to the compensated luminance signal in a separate adder circuit since it will be evident that the differentiated signal does not contain the information necessary for continuous display of the colour signals, nor the monochrome signal such as is necessary for satisfactory operation with the aid of a one-gun display tube 32.

It will also be evident that in the case of FIGURE 2, it is possible to use two detectors for detecting the colour television signal once in a manner as illustrated in FIGURE 1.

Also, it will be evident that, instead of using a one-gun display tube of the Lawrence type as shown in FIGURE 2 the circuit arrangement of FIGURE 2 can employ a one-gun tube of the Apple type, a so-called index tube. However, the colour-converting circuit is then extended because the information from the index signal has to be processed therein. The compensation for the luminance, however, remains unchanged.

What is claimed is:

1. A circuit arrangement for use in a colour television receiver of the type comprising a brightness channel, a source of a gamma-corrected total composite video signal, a display tube having a non-linear grid voltage-ray current characteristic, a colour channel, means applying said composite video signal to said brightness and colour channels, and means applying the outputs of said channels to said display tube, said colour channel including a filter which passes the colour information from the total composite video signal to produce a colour signal, said colour channel having a bandwidth which is smaller than that of the brightness channel, wherein the improvement comprises means for correcting faults occurring in the brightness of the colour television display, said correcting means comprising two differentiating networks in said colour channel connected to differentiate twice the colour signal derived from the filter in the colour channel to produce a twice differentiated signal, a delay line and an adder circuit in said brightness channel, and means applying said twice differentiated signal and the output of said delay line to said adder circuit, said delay line having a delay substantially equal to the delay of said twice differentiated filter and differentiating networks.

2. A circuit arrangement as claimed in claim 1, in which the colour channel includes means for modifying the colour signals before they are suitable to be applied to the display tube, said modifying means including at least one further filter, comprising a second delay line in the brightness channel, said second delay line having a retardation period equal to that of the further filter in the colour channel and being connected to the output of the said adder circuit.

3. A colour television receiver for receiving gamma corrected composite signals having a first component relating to the brightness of a scene and a second component comprising an auxiliary carrier modulated with one or more signals relating to the colour content of said scene, the frequency band of said second component being coincident with the higher frequency band part of said first component, said receiver comprising means for receiving said composite signals, first and second signal channels, means for applying said composite signals to said first and second channels, an image reproducing device, and means applying the outputs of said first and second channels to said image reproducing device, said second channel comprising means for separating said second component from said composite signal, and means for twice differentiating said second component to provide a correction signal, said first channel comprising means for adding said correction signal to said composite signal to correct for brightness errors resulting from colour transitions in said scene.

4. A colour television receiver for receiving gamma corrected composite signals having a first component relating to the brightness of a scene and a second component comprising an auxiliary carrier modulated with one or more signals relating to the colour content of said scene, the frequency band of said second component being coincident with the higher frequency band part of said first component, said receiver comprising means for receiving said composite signals, luminance and colour signal channels, means for applying said composite signals to said luminance and colour channels, an image reproducing device, and means applying the outputs of said luminance and colour channels to said image reproducing device, said colour channel comprising filter means for separating said second component from said composite signal, and means for twice differentiating said filtered second component to provide a correction signal, said luminance channel comprising delay means for delaying said composite signal to the same extent as said differentiated signal, and means for adding said correction signal to said composite signal to correct for brightness errors resuling from colour transitions in said scene.

5. A colour television receiver for receiving gamma corrected composite signals having a first component relating to the brightness of a scene and a second component comprising an auxiliary carrier modulated with one or more signals relating to the colour content of said scene, the frequency band of said second component being coincident with the higher frequency band part of said first component, said receiver comprising means for receiving said composite signals, luminance and colour signal channels, means for applying said composite signals to said luminance and colour channels, an image reproducing device, and means applying the outputs of said luminance and colour channels to said image reproducing device, said colour channel comprising means for separating said second component from said composite signal, and means for twice differentiating said second component to provide a correction signal, said luminance channel being adapted to pass substantially the full band of said composite signals and comprising means for adding said correction signal to said composite signal to correct for brightness errors resulting from colour transitions in said scene.

6. A colour television receiver for receiving gamma corrected composite signals having a first component relating to the brightness of a scene and a second componen comprising an auxiliary carrier modulated with one or more signals relating to the colour content of said scene, the frequency band of said second component being coincident with the higher frequency band part of said first component, said receiver comprising means for receiving said composite signals, a luminance signal channel for passing signals of substantially the full band of said composite signals, means for applying said composite signals to said luminance channel, an image reproducing device, means applying the output of said luminance channel to said image reproducing device, means for separating said second component from said demodulated composite signal, means for synchronously demodulating said separated second component and for applying said demodulated second component to said image reproducing device, and means for twice differentiating said separated second component to provide a correction signal, said luminance channel comprising means for adding said corrections signal to said composite signal to correct for brightness errors resulting from colour transitions in said scene.

References Cited

UNITED STATES PATENTS

| | | | |
|---|---|---|---|
| 2,773,116 | 12/1956 | Chatten | 178—5.4 |
| 2,916,544 | 12/1959 | Gibson et al. | 178—5.4 |
| 2,927,151 | 3/1960 | Loughren | 178—5.4 |
| 3,002,050 | 9/1961 | Richman | 178—5.4 |
| 3,070,653 | 12/1962 | Davidse | 178—5.4 |

JOHN W. CALDWELL, *Acting Primary Examiner.*

ROBERT L. GRIFFIN, *Examiner.*

J. A. O'BRIEN, *Assistant Examiner.*